Aug. 17, 1965   P. GUYOT ETAL   3,200,854
METHOD OF MANUFACTURING GRIDS FOR USE IN
ELECTRONIC DISCHARGE VALVES
Filed Feb. 14, 1961   3 Sheets-Sheet 1

PAUL GUYOT INVENTOR
LOUIS F.A.G. DIELEMAN

BY
AGENT

INVENTOR
Paul Guyot
LOUIS F.A.G. DIELEMAN
BY
AGENT

INVENTOR
Paul Guyot
LOUIS F.A.G. DIELEMAN.

3,200,854
METHOD OF MANUFACTURING GRIDS FOR USE IN ELECTRONIC DISCHARGE VALVES
Paul Guyot, Caen, France, and Louis François Abraham Dieleman, Eindhoven, Netherlands, assignors to North American Philips Company, Inc., New York, N.Y., a corporation of Delaware
Filed Feb. 14, 1961, Ser. No. 89,273
Claims priority, application Netherlands, Feb. 17, 1960, 248,531
8 Claims. (Cl. 140—71.5)

This invention relates to a method of manufacturing grids for use in electronic discharge valves or the like, in which a grid is wound on longitudinally movable grid stays. The wire is broken or cut off at the termination of a winding and, after an axial displacement of the grid stays the wire is refastened to a stay and subsequently winding is wound during the longitudinal movement of the stays. The stays are stretched, at least over their portions surrounded by windings, and during this period of standstill a separation is also carried out, for example by cutting so that a separate grid is obtained. This may be termed winding without intermediate ties. Such a method is described, for example, in French patent specification No. 1,201,551.

In the above noted method the portions of the grid stays on which a plurality of grids are successively wound and stretched exhibit small differences in length. In this method the cutting device performs the separation at a place which is fixed or stationary relative to the frame of the machine.

When a chain of a plurality of grids wound on common grid stays is made, the total length of this chain of grids will exhibit considerable tolerances between the stretching place and cutting mechanism. For example, the length tolerances of wound and unwound portions of the grid stays are only a few hundredths of a millimetre, whereas a total chain of successive grids will have a longitudinal tolerance of a few millimetres. Consequently, the cutting device cannot perform the separation between two successive grids so that they will have the same lengths. Thus in each grid manufactured the lengths of the freely projecting grid-stay portions exhibit considerable tolerances, which is highly undesirable for the automatic manufacture of electronic discharge valves in which these grids are mounted, for it is necessary that the longitudinal tolerances of the freely projecting portions of grids be held within narrow limits.

The present invention has for its object to provide a method and apparatus by which the above disadvantages are obviated.

The method according to the invention is characterized in that during the period of standstill of the grid stays the space between the grid-stay portions projecting freely after separation and the turn of the grid to be separated lying nearest the separation place is scanned by a sensing device movable in a direction opposite the propagation direction of the grid stays until the first turn of the grid to be separated is encountered. At this same time a cutting device for performing the separation is moved in the scanning direction and as soon as the said turn is struck, movement of the cutting device is stopped, at which point a grid is severed from the chain and the scanning device and the cutting device are moved back into their initial positions. In the method according to the invention use is made of the fact that the length tolerances both of the wound and of the adjacent unwound portions of the grid stays are small and that the distances between corresponding first turns of successive grids also exhibit a very small difference in length.

The sensing or scanning device and the cutting device are movable in an axial direction along the grid stays and for each separation the scanning device determines at what place between successive grids the separation is to take place. The scanning device and the cutting device are moving, during scanning, for the period of standstill of the grid stays, from an initial position which is stationary to the machine frame in a direction opposite the travel of the grid stays. This initial position is the same for each separation, but the distances covered by the two devices up to the moment of impact may be different for each grid separation to be carried out.

It is necessary to cause the scanning device and the cutting device to perform a ganged movement for at least the period during which they are moved in a direction opposite the direction of travel of the grid stays, so that when the scanning device has moved over a certain distance the cutting device has also moved over the same distance. In one embodiment of the method according to the invention, however, a mechanically coupled, simultaneous performance of the movements of the scanning device and of the cutting device along the grid stays is preferred.

The movement of the cutting device in a direction opposite the direction of travel of the grid stays is continuous in the method according to the invention until the scanning device, which is operative between windings, has come into contact with the first turn of the grid to be separated. It is desirable that as soon as this contact is established the cutting device should be stopped very rapidly. In a further embodiment of the method according to the invention this is performed by electromagnetic agency.

After a grid has been severed and before a further grid is severed, the chain of grids is moved a small distance and subsequently, the cutting device, having moved back into its initial position returns over the same distance, after which a second separation is performed, the arrangement being such that the grid stays are cut between successive grids at two places spaced apart by a small distance, viewed in the longitudinal direction of the stays. This embodiment has the great advantage that it obviates a disadvantage inherent in the stretching of grid stays.

Owing to the stretching of the grid stays, usually performed by means of stretching pincers engaging the unwound portion of the grid stays, the grids stays are slightly deformed at the places of engagement. Thus, many of the severed grids have projecting grid-stay portions which are more or less flattened near their ends. Grids to be mounted in electronic discharge valves, are inserted, with their free grid-stay portions into holes of an insulating plate, for example, of mica and since the dimensions of these holes are accurately adapted to the thickness of the grid stays, such more or less flattened ends are undesirable. In a further embodiment of the method according to the invention the flattened parts of the grid stays between successive grids can be removed in a simple manner. This can be achieved by performing in order of succession a separation at two places lying between successive grids, the second separation always taking place at a constant distance from the place of the first separation.

The device and method according to the invention is particularly useful in combination with a grid winding machine comprising means to feed grid stays, means to wind a wire on these longitudinally movable stays so that a grid is formed on the stays and the turns of the grids are not interconnected, means to stretch at least the wound portion of the grid stays, while provision is made of a cutting device to sever the stays during a period of standstill of these stays, for example, by cutting, so that separate grids are obtained. The device according to the invention is characterized in that it comprises a scanning device, which together with a movable cutting device, is movable along the grid stays so that during the period of standstill of the stays the said devices are capable of performing a movement opposite the direction of travel of the grid stays. Provision is furthermore made of means to stop at least the movement of the cutting device after a sensor connected with the scanning device and arranged in a path between the grid stays has contacted the turn of the grid to be severed nearest the preceding cutting place. At this point the cutter performs a separation and then both the scanning device and the cutting device move back to their initial positions.

The invention will now be described with reference to the drawing, which shows diagrammatically one embodiment, of the invention.

Figure 4:
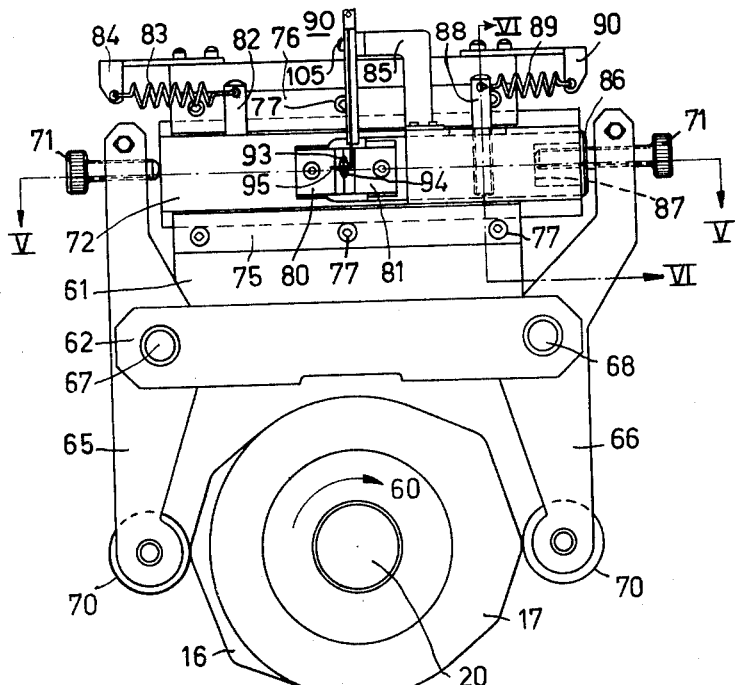
Figure 5:
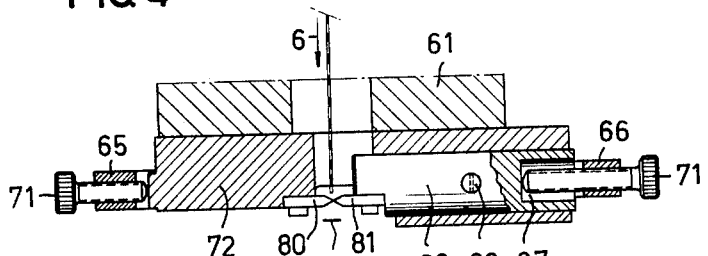
Figure 6:
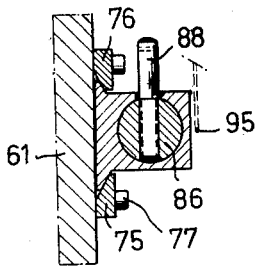

FIGS. 4, 5 and 6 show a few details of a grid winding machine comprising a cutting device and a scanning device according to the invention. FIG. 4 is an elevation taken transversely to the travel of the grid stays. FIG. 5 is part of the sectional view taken on the line V—V of FIG. 4 and FIG. 6 is part of a sectional view taken on the line VI—VI of FIG. 4.

Figures 7, 8:
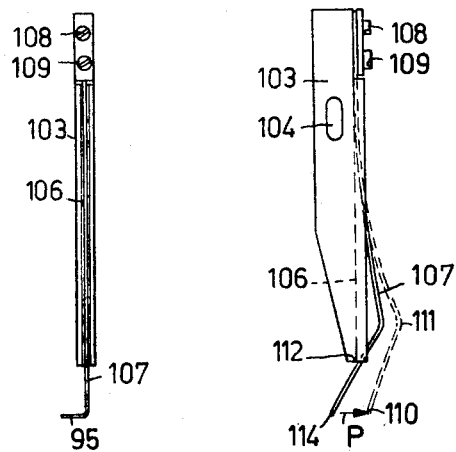

FIGS. 7 and 8 show in a front view and in a side view a detail of the scanning device.

Figure 1:
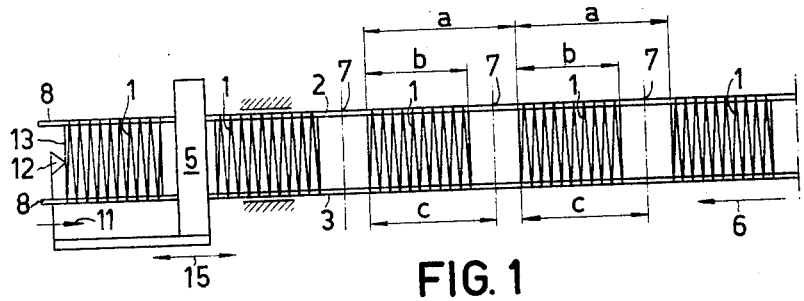
FIG. 1 shows part of a chain of grids wound on common grid stays, manufactured by the known method noted above.

In a known method of manufacturing grids for use in electronic discharge valves as described in French patent specification No. 1,202,551 a chain of grids 1 is manufactured, without intermediate ties, on common longitudinally movable grid stays 2 and 3 (arrow 6) (FIG. 1). The grid stays 2 and 3 are stretched for a short time and during a period of standstill of the grid stays these stays are separated so that each time a separate grid is produced.

Owing to the repeated stretching each of the distances $a$ and $b$ exhibit relative differences, which are, however, small (for example, 0.02 mm.). In the known method the separation is performed at a place which is always stationary with respect to the machine frame (for example at a constant distance from the winding head 4). For the same number of grids the length of the chain will not always be the same; differences up to, for example, a few millimetres may occur. After each separation grids are therefore obtained, of which the corresponding projecting free stay portions exhibit great tolerances in length.

In order to ensure that the grid stays are always severed at the same desired place 7, use may be made, in accordance with the invention, of the fact that the distances $a$ and $b$ in a full chain of grids exhibit a very small tolerance in length. Consequently, the distances $c$ of the first turn of a grid to the next-following desired separation place 7 will also have a small tolerance in length. In accordance with the invention the cutting device 5 is adapted to move along the grid stays and the cutting control is such that the separation is not performed until the operative edges of the knives of the cutting device 5 are at a distance $c$ from the first turn 13.

To this end the cutting device 5 is connected with a scanning member, designated by 12 in FIG. 1, which is capable of scanning the space between the freely projecting grid stays 8 during a period of standstill of the grid stays and moving in the direction of the arrow 11, the cutting device being stopped in a manner to be described hereinafter, when the scanning member 12 strikes or contacts the first turn 13 of a grid winding.

Figure 2:
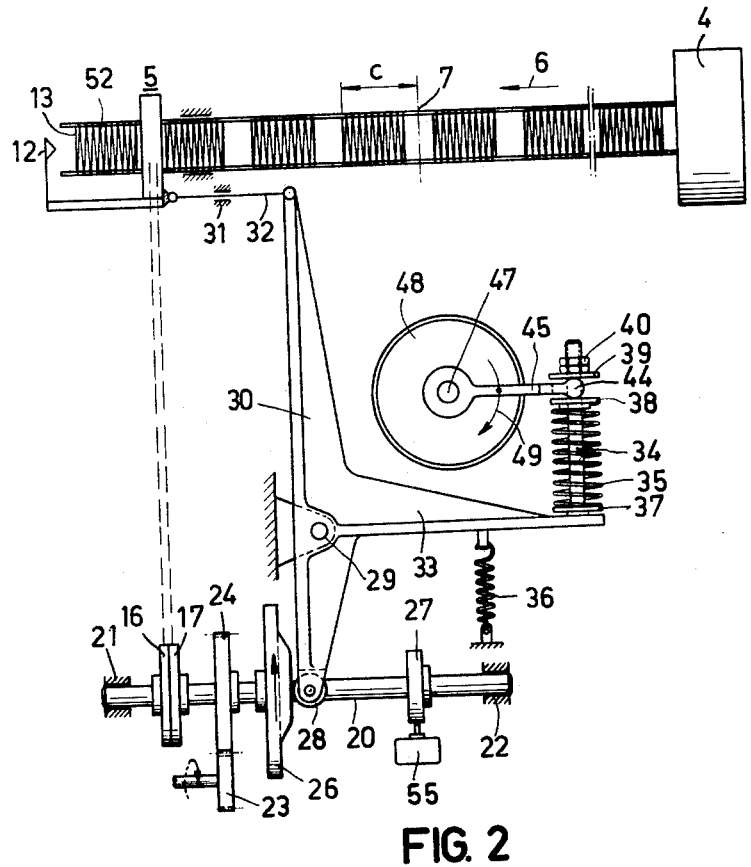
FIG. 2 shows a diagrammatic survey of the required elements for separating grids from the chain of grids of FIG. 1 in accordance with the invention.

FIG. 2 shows a diagrammatical survey of the elements required for carrying out the invention. The shaft 20, journalled rotatably in the bearings 21 and 22 and set rotating by a gear transmission (23, 24), has a cup-shaped disc 26 to move the cutting device 5 along the grid stays. Two cam discs 16 and 17 also on shaft 20 govern operation of the cutters and a cam disc 27 hereinafter described. A roller 28 is movable on the side surface of the cup-shaped disc 26. This roller is provided at one end of a lever 30, adapted to pivot about a stationary shaft 29 and pivoted at its other end to an arm 32 adapted to slide in any suitable means 31, which is stationary or fixed to the machine frame. The other end of the arm 32 is pivoted to the cutting device 5, provided with a scanning member 12. To the lever 30 is rigidly secured an arm 33, the end of which is provided with a shaft 34. The arm 33 is connected with the machine frame by means of a draw spring 36. Provision is furthermore made of a dish spring 37, connected with the shaft 34 and of a dish spring 38, adapted to slide along the shaft 34, a pressure spring 35 being provided between the said springs. At the other end of the shaft 34 provision is made of by a nut and a counternut 39 and 40 respectively. Between the nut 39 and the slidable dish spring 38 is arranged the forked end 44 of a lever 45, which is seated on a shaft 47. The rotation of this shaft 47 can be blocked by an electromagnetic brake 48.

Figure 3:
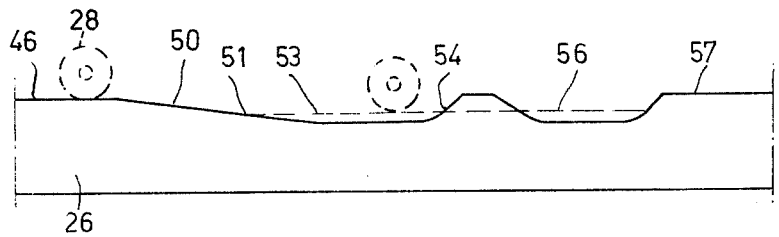
FIG. 3 shows diagrammatically part of the profile of the cup-shaped disc 26 of FIG. 2.

The operation will be explained with reference to the diagram of FIG. 3.

During a period of standstill of the grid stays the roller 28 is located on the high flank 46 of the cup-shaped disc 26, the knives of the cutting device 5 are in the open state and the scanning member 12 is in a path between the grid stays. The distance between the scanning member 12 and the operative edges of the knives is equal to $c$. Owing to the rotation of the cup-shaped disc 26 the roller 28 is urged against the descending sloping part 50 the cup-shaped disc 26 by the spring 36 and thus the cutting device 5 with the scanning member 12 will move to the right as seen in both FIGS. 2 and 3. At the same time the shaft 34 is moved downwards and the lever 45 turns in the direction of the arrow 49. The movement of the cutting device to the right is continued and the scanning member 12 engages the first turn 13 of the grid 52 (FIG. 2) to be severed from the grid chain 1. The scanning and cutting device is electrically wired in a manner unnecessary to describe in detail, so that the said contact between sensor 12 and the grid wire 52 energizes the electromagnetic brake 48 and a further turn of the shaft 47, and hence of the lever 45, in the direction of the arrow 49 is prevented. Blocking of the lever 45 results in the roller 28 no longer following the sloping part of the cup-shaped disc 26 and is thus set free (at 53) from the cup-shaped disc. The point of blocking is designated in FIG. 3 by 51. As a result the further movement to the right of the cutting device and of the scanning member 12 is prevented. Thereafter the cutters are operated under the control of the cam discs 16 and 17.

After the cutter operation the roller 28 arrives on the ascending part 54 of the disc since the disc 26 continues to rotate and the cutting device 5 and the scanning member 12 return to their initial positions. The lever 45, however, maintains its blocked position during the said movement, and therefore moves away from the nut 39, while the spring 35 is compressed.

Since the stretching pincers engage the grid stays, the latter have a damaged spot between successive grids. With respect to the first turn of each grid this damage will always lie at the same place. By carrying out two separations between the same successive grids these damaged parts can be removed. To this end, after the cutting device has returned to its starting point (roller 28 on the high flank of the cup-shaped disc 26) the grid stays are moved over a given distance of for example 2.5 mms. in the direction of the arrow 6 (FIG. 1) and subsequently the cutting device is again moved over the same distance to the right as during its first movement for the first cutting operation. The roller 28 is then again set free of the cup-shaped disc 26 (broken line 56 in FIG. 3). The blocked lever 45 serves in this case as a "memory" for limiting the downward movement of the shaft 34. After the second separation the cutting device and the scanning member 12 can be returned into their initial positions as above described.

The control of the separation by means of the central shaft 20 may be such that the knives remain closed for a short time when the cutting device 5 moves back into its initial position in order to obtain a complete severance of a grid from the chain of grids, particularly if the grid stays are made of a material resisting cutting. Consequently, in order to separate one grid from the chain of grids the cutting device performs two rocking movements in the axial direction of the grid stays.

When two cutting operations have been performed at a short distance from each other, the energizing current of the brake magnet 48 is then interrupted. This may be accomplished by means of the aforesaid cam disc 27, which co-operates with a microswitch 55. Thus after the two cutting operations are completed the blocking of the lever 45 is unnecessary. Before the scanning member 12 performs a new scanning movement, the microswitch is again switched on in known manner so that the brake 48 is again energized by contact between the scanner and sensor 12.

When the scanning member contacts the first turn 13 of the grid 52 to be severed and an electrical contact is established between the scanning member and the first turn so that the electromagnetic brake is energized, a suitable choice of the combination of the amplification of the produced low electrical current and a quick-action magnetic brake permits obtaining a very short and constant total delay time between the instant of impact between the first turn and the scanning member and the instant of stopping of the cutting device. This may be taken into consideration when adjusting the distance between the scanner and the cutting device, so that the distance between the active end of the scanner 12 and the active edge of the knives in the cutting device 5 will be chosen slightly smaller than c. However, after the impact of the scanner on the first turn 13, the scanner will move on over a small distance and press against this turn. In order to avoid damage of the first turn it is desirable to arrange the scanner 12 in a resilient manner with respect to the cutting device 5.

The arrangement of the cutting device 5 and its operation will be described more fully in connection with FIG. 4.

Referring to FIG. 4, reference numeral 20 designates the central shaft of the grid winding machine; this shaft is adapted to rotate continuously in the direction of the arrow 60. On this shaft 20 are seated two cam discs 16 and 17; 61 and 62 designate stationary machine parts. The levers 65 and 66, which are pivotable about shafts 67 and 68, each have at one end a cam roller 70 and at the other end a set screw 71. Provision is furthermore made of a sledge or slide 72, which is adapted to slide in a dovetail guide, formed by strips 75 and 76, secured by bolts 77 to a movable machine part 61 (see also FIGS. 5 and 6). On the sledge 72, in which one of the knives 80 is secured, is provided a pin 82, which is connected by a draw spring 83 with the projecting part 84. A scanner 12 is also connected with this sledge by means of a connecting strap 85.

Within the sledge 72 or piston 86 is arranged to slide (see FIG. 6 also) and has at an end a recess 87, which serves as a stop for the set screw 71. At the other end piston 89 has a flat part, on which the knife 81 is arranged. As in the sledge 72 the shaft 86 has a pin 88, which is connected with a fixed part 90 by a draw spring 89.

Owing to the force exerted by draw springs 83 and 89 through the sledge 72 the shaft 86, and set screws 71, the rollers 70 are urged against the cam discs 16 and 17.

When the shaft 20 rotates and the rollers 70 arrive on the sloping flanks of the cam discs 16 and 17, the rollers 70 will move, against the force of the springs 83 and 89. Thus sledge 72 is moved to the right whereby the shaft 86 to the left and the knives 80 and 81 perform a cutting movement against the grid stays 93 and 94 (FIG. 4). During this cutting movement the scanner 12, provided with a resilient end 95 (see FIGS. 7 and 8) performs also a movement to the right so that the end 95 operative in a path between the grid stays 93 and 94 is removed. This permits of removing the separated grid 52 (FIG. 2) in the axial direction of the grid stays 93 and 94 without the scanner end 95 being a source of trouble.

The scanner 90 (see FIGS. 7 and 8) comprises mainly an elongated holder 103 of insulating material, for example, Plexiglas. This holder has an aperture 104 to secure the holder by a screw (105) to the strip 85 (FIG. 4). The holder has furthermore a narrow slot 106. This slot constitutes a locating place for the elastic current-conducting scanning wire 107, which is slightly bent over at 111 and has a strongly curved end 95. The elastic wire is secured at one end by screws 108 and 109 to the holder 103. Under no-load conditions the wire will thus engage under bias tension the side 112 of the slot. Thus the place 114 with respect to the holder is accurately determined. When the end 95 contacts the first turn of the grid to be severed, the contact place will always lie at the same spot relative to the holder. After the end 95 has contacted the first turn of the grid to be severed, the scanning device may move a very small distance. With a view to avoid damage of the first turn the resilience should be such that the force P required to move the end 95 into a position 110 is very small. In practice this force amounts to not more than a few grammes.

What is claimed is:
1. In a method of manufacturing grids for electron tubes in which a pair of continuous grid stays are wound with a series of discrete spaced grid windings comprising the steps of locating the first turn of each said winding and cutting the grid stays between the said series of grid windings a predetermined distance from said location.

2. A method of separating individual grids from a continuous grid chain having discrete windings disposed longitudinally along a pair of grid stays the steps comprising scanning the grid chain longitudinally, locating the first turn of each grid winding and cutting the grid stays between windings a predetermined distance from the point at which said first turn is located.

3. A method of separating discrete grid windings disposed in spaced relation longitudinally of continuous grid stays the steps comprising moving a scanning means over the grid stays longitudinally in one direction and simultaneously moving cutting means over the grid stay in the same direction a predetermined distance spaced from said scanning means, sensing the location of the first turn of each said grid winding and actuating said cutting means upon sensing said location.

4. A method of separating discrete grid windings disposed in spaced relation on continuous grid stays the steps comprising locating the first turn of each said winding, cutting the grid stays at a predetermined distance from said location, advancing the uncut grid stays through said cutting location a second predetermined distance and repeating said cutting step to remove distorted portions of the grid stays.

5. Apparatus for manufacturing grids for electron tubes in which a plurality of discrete grid windings are wound on a pair of continuous grid stays comprising:
 means for severing said grid stays between grid windings,
 means for moving said first named means longitudinally of said continuous grid stays,
 scanning means for sensing the first turn of each said grid winding, said scanning means being spaced from said first named means a determined distance, and means for operating said first named means at said determined distance upon contact between said first turn and said scanning means for severing said grid stays at said determined distance from said first turn.

6. Apparatus according to claim 5 wherein said first named means and said scanning means are each supported in predetermined spaced relation from one another on said means for moving said first named means.

7. Apparatus for manufacturing grids for electron tubes in which a plurality of discrete grid windings are wound on a pair of continuous grid stays comprising:

means for severing said grid stays between grid windings, means for moving said first named means longitudinally of said continuous grid stays, scanning means for sensing the first turn of each said grid winding, said scanning means being spaced from said first named means a determined distance, electromagnetic means operable in response to contact between said scanning means and said first turn for arresting movement of said first named means relative to said grid stays, and means for operating said first named means to sever said grid stays at said determined distance from said first turn.

8. Apparatus for manufacturing grids for electron tubes in which a plurality of discrete grid windings are wound on a pair of continuous grid stays comprising:

means for severing said grid stays between grid stays between grid windings, means for moving said first named means longitudinally of said continuous grid stays, scanning means for sensing the first turn of each said grid winding, said scanning means being spaced from said first named means a determined distance, electromagnetic brake means operable in response to contact between said scanning means and said first turn for arresting movement of said first named means relative to said grid stays, means for operating said first named means to sever said grid stays at said determined distance from said first turn, and means to maintain said electromagnetic means operable for a determined period of time after severance of said grid stays independently of contact between said scanning means and said first turn.

References Cited by the Examiner

UNITED STATES PATENTS

| | | | |
|---|---|---|---|
| 873,430 | 12/07 | Harter | 83—372 |
| 1,978,108 | 10/34 | Howald et al. | 140—71.5 |
| 2,181,288 | 11/39 | Washburn | 140—71.5 |
| 2,480,677 | 8/49 | Sheffield | 140—71.5 |
| 2,654,401 | 10/53 | Legendre et al. | 140—71.5 |
| 2,909,200 | 10/59 | Miller et al. | 140—71.5 |

FOREIGN PATENTS 884,720    7/53    Germany.

CHARLES W. LANHAM, *Primary Examiner.*

RICHARD A. WAHL, *Examiner.*